United States Patent [19]
Kimura et al.

[11] 3,794,171
[45] Feb. 26, 1974

[54] APPARATUS FOR PURIFYING WASTE LIQUIDS

[75] Inventors: Hiroshiro Kimura, Kyoto; Seiji Yoshii, Hyogo; Masao Tanaka, Gifu, all of Japan

[73] Assignee: Unitika Ltd., Amagasaki-shi, Hyogo, Japan

[22] Filed: May 24, 1972

[21] Appl. No.: 256,247

[30] Foreign Application Priority Data
May 24, 1971   Japan.............................. 46-35688

[52] U.S. Cl................. 210/205, 209/170, 210/220, 210/221, 210/519, 261/77
[51] Int. Cl..........................................B03d 1/00
[58] Field of Search ........................... 209/168–170; 210/44, 205–209, 220, 221, 320, 519, 528, 83, 196, 200, 256, 521, 522; 261/77, 124

[56] References Cited
UNITED STATES PATENTS
3,301,779   1/1967   Kovacs................................. 210/44
3,236,384   2/1966   Sontheimer et al............. 210/208 X
2,746,605   5/1956   Baum............................. 210/205 X
3,433,359   3/1969   Lundin et al. ................... 210/221 X
3,446,353   5/1969   Davis.............................. 209/170 X Primary Examiner—John Adee
Assistant Examiner—Robert H. Spitzer
Attorney, Agent, or Firm—Sughrue, Rothwell, Mion, Zinn & Macpeak

[57] ABSTRACT

An apparatus for purifying waste liquids which includes (a) a mixing chamber for introducing and mixing a pressurized gas-liquid phase, which substantially saturatedly dissolves a pressurized air into a waste liquid under the pressure, (b) a curved liquid chamber having a flat circular arcuate or curved spiral for separating the waste liquid into substances to be removed, such as flocs, etc., and a liquid, and (c) a scum outlet duct so disposed as to communicate with the curved liquid chamber at the upper portion of the chamber for discharging a scum of the substances to be removed floating on the surface of the liquid in the curved liquid chamber. The mixing chamber and the curved liquid chamber are separated from each other with partitions, but one of the partitions has an opening at the upper portion thereof so as to communicate the mixing chamber with the curved liquid chamber.

8 Claims, 5 Drawing Figures

PATENTED FEB 26 1974 3,794,171

APPARATUS FOR PURIFYING WASTE LIQUIDS

BACKGROUND OF THE INVENTION

1. Field of the Invention

This invention relates to an apparatus for separating and removing substances to be removed, such as flocs, etc., and a liquid in a waste liquid by introducing a pressurized gas-liquid phase, which substantially saturatedly dissolves a pressurized air into a waste liquid (hereinafter this is merely referred to as "a dissolved gas"), under the pressure.

2. Description of the Prior Art

Various waste liquid purification plants of such a system are known and can be categorized generally as a vertical or horizontal type. Such conventional devices have been found unsatisfactory in that the purification efficiency cannot be appreciably enhanced by increasing the supply of the dissolved gas to the waste liquid; that is, the amount of fine gas bubbles to be generated in the waste liquid therefrom. In the conventional waste liquid purification systems employing the uprising vertical type tank, tubes for supplying the dissolved gas are generally connected to the bottom of the vertically extending tank wherein a lower half of the tank is a mixing section for mixing the dissolved gas in the waste liquid and the upper half of the tank is adapted for separation and removal of substances to be removed such as flocs, etc., and a liquid in the waste liquid.

A problem arising in the above-described conventional systems is that the supply of the dissolved gas to the waste liquid is increased because of the tendency to significantly disturb the surface of the waste liquid in the tank which leads to violent vertical agitation in the flocs floating on the liquid. Such action results in more flocs being peeled off from the attachment to the gas bubbles and dropping and settling again in the waste liquid which interferes with the ability to increase the purification efficiency obtainable from increasing the amount of the dissolved gas supplied to the basin.

The horizontal type of waste liquid purifying apparatus generally consists of a flat and rectangularly shaped tank defining a mixing chamber facing one end wall of the tank and adapted for introducing and mixing a dissolved gas in the waste liquid, and a scum outlet duct located in the other end wall of the tank. In this arrangement, gas bubbles generated and floating on the surface of the liquid in the tank sometimes break as they travel from the mixing chamber to the scum outlet duct and this cannot be compensated for, even by increasing the amount of the dissolved gas supplied to the waste liquid in the mixing chamber. Consequently, the vertical thickness of the gas bubble layer floating on the surface of the liquid in the tank generally decreases from the mixing chamber toward the scum outlet duct. The result of this is that a significant amount of flocs or other solid particles carried by the gas bubbles floating on the liquid to the scum outlet duct are released and allowed to fall and drop again in the waste liquid, thus leading to a considerable reduction in purification efficiency.

SUMMARY OF THE INVENTION

One of the objects of the present invention is to overcome the above mentioned problems and provide an improved waste liquid purification apparatus, which is capable of substantially increasing the purification efficiency by increasing the supply of the dissolved gas to the waste liquid.

Briefly stated, there is provided a waste liquid purification apparatus which comprises a mixing chamber for introducing and mixing the dissolved gas in a waste liquid, and a curved liquid chamber having a flat circular arcuate or curved spiral for separating the waste liquid into substances to be removed such as flocs, etc., and a liquid, and a scum outlet duct so disposed as to communicate with the curved liquid chamber at the upper portion of the chamber for discharging a scum of the substances to be removed floating on the surface of the liquid in the curved liquid chamber. The mixing chamber and the curved liquid chamber are separated from each other with partitions, but one of the partitions has an opening at the upper portion thereof so as to communicate the mixing chamber with the curved liquid chamber.

One of the most advantageous features of the present invention is the provision of a partition with an opening at the upper portion thereof so as to communicate the mixing chamber for introducing and mixing the dissolved gas in the waste liquid and the liquid chamber for separating the waste liquid into substances to be removed, such as flocs, etc., and a liquid.

When an increased amount of dissolved gas is supplied to the mixing chamber, substantial turbulence will result in the waste liquid within the mixing chamber, but the transmission and adverse effect of such turbulence to the adjacent liquid chamber is effectively prevented by the existence of the partition so that particles attached to or affixed to the gas bubble will travel to the scum outlet duct without rolling or agitation with the assistance of scraper means or suction forces. These particles will be discharged as a scum through the scum outlet duct out of the apparatus without encountering substantial up and down movement through vertical displacement of the particles attached to the gas bubbles on the surface of the liquid throughout from the end of the liquid chamber adjacent to the mixing chamber to the opposite end of the liquid chamber wherein the scum outlet duct is connected.

Another advantage of the present invention is achieved by the use of a curved liquid chamber having a flat arcuate curved spiral for a better liquid-solid separating characteristic.

Unlike the conventional horizontal type waste liquid purification system utilizing a rectangular shaped tank, the vertical thickness of the gas bubble layer floating on the liquid in the curved liquid chamber of the present invention increases toward the scum outlet duct since a significant amount of gas bubbles are generated and, rising up to the surface of the waste liquid in the mixing chamber, flows through the opening of the partition provided at the upper portion thereof, substantially isolating the mixing chamber from the curved liquid chamber in the shortest curved path along the innermost periphery of the curved liquid chamber to the scum outlet duct. The amount of such direct flowing gas bubbles is largely in excess of the breaking of the gas bubbles during the travel through the liquid chamber.

Such a situation has been found to be productive of highly beneficial results in that increased vertical thickness of the gas bubble layer stacked on the liquid in the vicinity of the scum outlet duct generates and sustains a sufficient amount of back up pressure to support the scum layer having an increasing vertical thickness toward the outlet. This results because of the cohesion of the particle carrying gas bubbles during travel over the curved liquid chamber to the scum outlet duct with the assistance of a scraper means.

Thus, a substantial part of the scum floating and flowing on the liquid is discharged through the outlet duct out of the apparatus without falling or dropping again in the liquid which would reduce the operation efficiency of the apparatus.

In accordance with the present invention, the supply of dissolved gas to the waste liquid can be increased without causing substantial disturbance in the substances to be carried by the gas bubbles floating on the liquid in the liquid chamber and the increase in the amount of dissolved gas will result in a corresponding improvement in the purification efficiency without substantial losses, due to the vertical thickness of the gas bubble layer floating on the surface of the liquid appreciably increasing toward the scum outlet duct.

The above and other features of the present invention, including various novel details of construction and combination of parts, will be more particularly described with reference to the accompanying drawings.

BRIEF DESCRIPTION OF THE DRAWINGS

Reference is made to the accompanying drawings in which there are shown illustrative embodiments of the present invention from which the novel features and advantages thereof will become apparent.

DETAILED DESCRIPTION OF THE PREFERRED EMBODIMENTS

Figure 1:
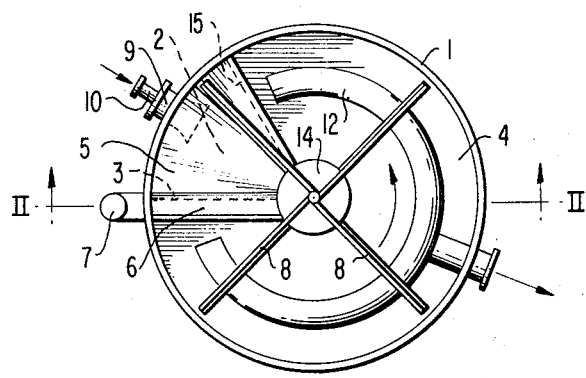
FIG. 1 is a plan view of a preferred embodiment of the apparatus in accordance with this invention.
Figure 2:
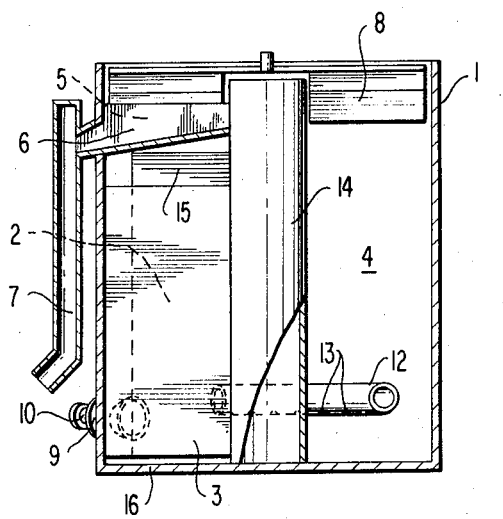
FIG. 2 is a cross sectional view taken along line II—II of FIG. 1.
Figure 4:
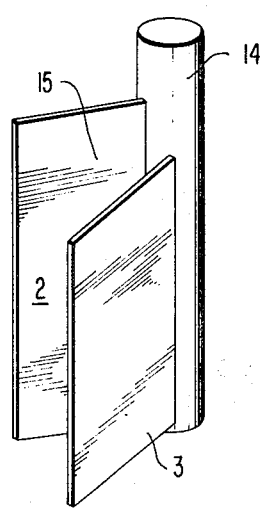
FIG. 4 is a perspective view showing the arrangement of the two opposed partitions, one being disposed between one end of the mixing chamber for introducing and mixing a dissolved gas in the waste liquid and the adjacent end of the curved liquid chamber, and the other being employed to isolate the other end of the mixing chamber from the adjacent end of the liquid chamber.
Figure 3:
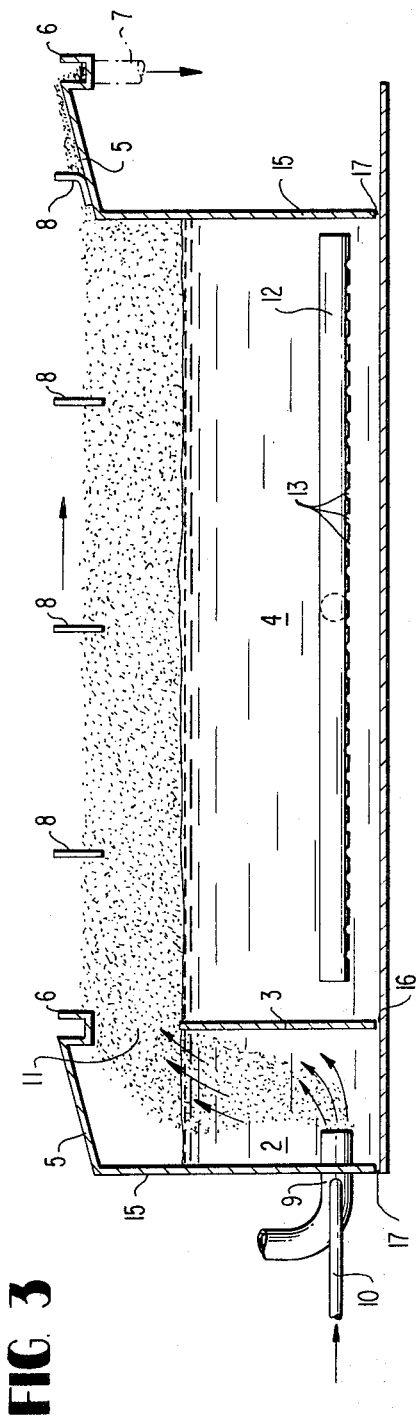
FIG. 3 is a vertical cross sectional view developed at the circumference of the tank including the curved liquid chamber having a flat arcuate bottom.

A cylindrical tank, which is desirable from the standpoint of minimizing dead spaces, is generally designed by reference number 1, in the drawings, comprising a mixing chamber 2 for introducing and mixing dissolved gas in the waste liquid, and a liquid chamber 4 for separating a waste liquid into substances to be removed such as flocs, etc., and a liquid. The liquid chamber and the mixing chamber are separated from each other by the interposition of partitions 3 and 15, but partition 3 has an open section provided at the upper portion thereof so as to communicate the mixing chamber with the liquid chamber.

Figure 5:
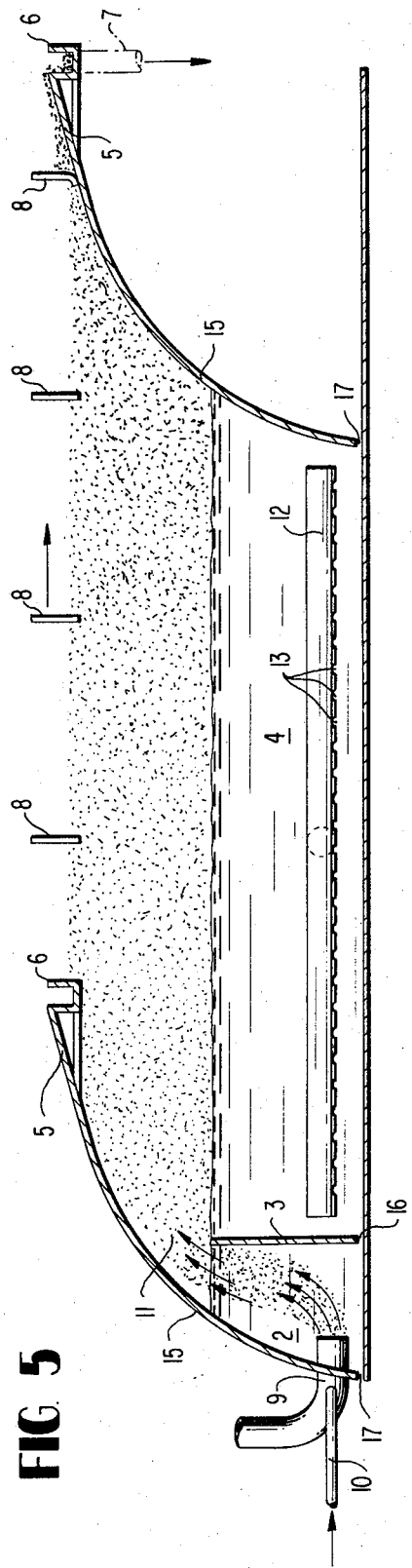
FIG. 5 illustrates a vertical cross section developed along a circumference of the basin, showing an alternative embodiment of the present invention in which the tank has a curved spiral through a certain angle of the arc.

In the embodiment illustrated in FIGS. 1 to 4, the mixing chamber 2 is essentially an arcuate chamber and the liquid chamber 4 with a flat circular arcuate forms the remainder of the round tank. However, it is understood that other mixing chamber configurations may be employed and the curved liquid chamber could have a portion of a spiral, as shown in FIG. 5.

Although the capacities of the mixing chamber 2 and the liquid chamber 4 are not critical, it is desirable in order to achieve the full benefits of the present invention that the angle of the arcuate mixing chamber 2 be within the range of 30° to 80°, preferably 50° to 60°.

The end of the curved liquid chamber 4 remote from the partition 3 is connected to a scum outlet duct 7 through an inclined plate 5 covering the top of the mixing chamber 2 and through a trough 6. A scum discharge device 8 is provided on the liquid within the tank, which, in the illustrated embodiment includes a plurality of scraper blades rotating in the counterclockwise direction in FIG. 1.

As the waste liquid is continuously fed to the bottom of the mixing chamber 2 through a conduit 9, the dissolved gas is also introduced into the bottom of the mixing chamber 2 through a tube 10 coaxially extending into the conduit 9.

The dissolved gas is thus forcefully mixed with the waste liquid within the mixing chamber 2 so that numerous fine gas bubbles are generated in the waste liquid by reducing the gas pressure of the dissolved gas. When the gas bubbles rise up to the surface of the liquid, they pick up and carry flocs or other contaminated particles floating on the surface of the liquid.

The waste liquid with flocs or other contaminated particles attached to the gas bubbles on the surface of the liquid is then passed from the mixing chamber 2 through the opening 11 defined over the upper communicating portion of the partition 3 and then to the liquid chamber 4 in which the scum thus formed and floating on the surface of the liquid is forced toward the scum outlet duct 7 by the scum scraper means 8 and discharged from the other end of the liquid chamber 4 (the rightmost end in FIG. 3) over the inclined plate 5 and through the trough 6 and the scum outlet duct 7 out of the tank 1.

While the rotating blade type scraper device 8 is shown in the illustrated embodiment, various other types of scraper or discharge means, such as a suction duct, could be employed instead of the rotating scraper blades.

Due to the presence of the partition 3 between the mixing chamber 2 and the liquid chamber 4, any stimulus or turbulence induced at the top of the waste liquid within the mixing chamber 2 is effectively prevented from transmission to the liquid chamber and accordingly the gas bubble layer on the top of the liquid within the liquid chamber 4, particularly in the vicinity of the scum outlet duct 7, is substantially free from rolling or disturbance.

Moreover, since the liquid chamber 4 is curved in an arcuate or spiral configuration, a significant portion of the gas bubbles generated in the mixing chamber 2 flows in the shortest path along the innermost wall of the curved liquid chamber 4 to the scum outlet duct 7 so that the vertical thickness of the layer of gas bubbles floating on the liquid chamber is substantially increased toward the scum outlet duct 7.

It should be readily appreciated that appreciable improvements in the purification efficiency of the waste liquid purification plant are possible in this invention merely by increasing the supply of the dissolved gas.

The clarified waste liquid is withdrawn through openings 13 formed in the bottom of a pipe 12 and through the pipe 12 out of the tank 1. The opening 11 over the partition 3 may preferably be adjustable in its vertical dimension depending upon the proportion of the dissolved gas supply with respect to the amount of the waste liquid to be treated, the feeding rate of the dissolved gas to the tank or the depth of waste liquid in the tank 1 being such that efficient purification performance at all times is attained.

One method of making the opening 11 adjustable is to provide a vertically movable wall (not shown) in the partition 3 for adjustment of the vertical thickness of the opening 11.

As a further alternative, a hollow tube 14 located centrally to the tank 1 may be employed as a duct for discharging the scum from the tank in place of the discharge line comprising the inclined plate 5, the trough 6 and the scum outlet duct 7 described in conjunction with the illustrated embodiments.

The partition 3 and a partition 15 completely isolating the liquid chamber 4 from the mixing chamber 2 at the end opposite to the partition 3 may both be provided with apertures 16 and 17 which allow withdrawal of the liquid from the bottom portion of the liquid chamber in the vicinity of the partitions 3 and 15 to the mixing chamber which is induced by the uprising flow of fine air bubbles generated in the mixing chamber 2.

The liquid flow passing through apertures 16 and 17 into the mixing chamber accompanies a substantial amount of the flocs which have settled and dropped in the liquid near the partitions 3 and 15 and carries them again to the mixing chamber 2 in which the flocs are picked up by fresh air bubbles.

Although the present invention has been adequately described in the foregoing specification, it is readily ascertainable that various changes and modifications can occur without departing from the spirit and scope thereof.

What is claimed is:

1. An apparatus for purifying waste liquid, comprising:

a vertically oriented cylindrical tank, first and second circumferentially spaced, vertical partitions within said tank, being joined at their inner ends and extending radially outward from the tank center and separating said tank into adjacent, curved, mixing and liquid chambers, one of said partitions being of a vertical height less than the other to form a circumferential opening to communicate the mixing chamber with the liquid chamber, an untreated liquid inlet opening up into said mixing chamber, a treated liquid outlet fluid coupled to said liquid chamber, and a scum outlet duct communicating with the upper portion of the liquid chamber for discharging the flocs and other contaminated particles floating on the surface of the liquid in the liquid chamber.

2. The apparatus of claim 1 wherein said curved liquid chamber is connected at the partition other than that communicating the liquid chamber with said mixing chamber to the scum outlet duct by the interposition of an inclined plate and a trough, which inclined plate overlies said mixing chamber.

3. The apparatus of claim 2 wherein said scum outlet is defined by a hollow tube extending centrally through the tank.

4. The apparatus of claim 1 further comprising a plurality of rotating scraper blades mounted for rotation about a vertical axis at the top of said tank in contact with the liquid within said liquid chamber for removing the scum floating on the liquid by forcing said scum toward said scum outlet duct.

5. The apparatus of claim 1 further comprising suction means for removing the scum floating on the liquid through said scum outlet duct.

6. The apparatus of claim 1 wherein said partition between said mixing chamber and the curved liquid chamber which forms said circumferential opening communicating said mixing chamber with the curved liquid chamber includes a vertically adjustable wall.

7. The apparatus of claim 1 wherein said partitions between said mixing chamber and said curved liquid chamber are provided at their lower ends with apertures extending therethrough.

8. The apparatus of claim 1 wherein said treated liquid outlet is a tube disposed on the bottom of said curved liquid chamber for withdrawing purified waste liquid and includes apertures spaced along the bottom of said tube.

* * * * *